(12) United States Patent
Li

(10) Patent No.: US 9,341,350 B2
(45) Date of Patent: May 17, 2016

(54) FASTENING DEVICE FOR LED LIGHT STRING OF BACKLIGHT MODULE AND LIQUID CRYSTAL DISPLAY

(71) Applicant: Shenzhen China Star Optoelectronics Technology Co., Ltd., Shenzhen, Guangdong (CN)

(72) Inventor: Quan Li, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 302 days.

(21) Appl. No.: 13/880,059

(22) PCT Filed: Mar. 14, 2013

(86) PCT No.: PCT/CN2013/072612
§ 371 (c)(1),
(2) Date: Apr. 18, 2013

(87) PCT Pub. No.: WO2014/139124
PCT Pub. Date: Sep. 18, 2014

(65) Prior Publication Data
US 2015/0029444 A1    Jan. 29, 2015

(30) Foreign Application Priority Data

Mar. 11, 2013  (CN) .......................... 2013 1 0076484

(51) Int. Cl.
*F21V 8/00* (2006.01)
*G02F 1/1335* (2006.01)
*F21V 19/00* (2006.01)
*F21V 29/00* (2015.01)
*H01L 23/367* (2006.01)
*H01L 23/34* (2006.01)
*H01L 23/36* (2006.01)
*H01L 23/40* (2006.01)

(52) U.S. Cl.
CPC .............. *F21V 19/003* (2013.01); *F21V 29/22* (2013.01); *G02B 6/0073* (2013.01); *G02F 1/1336* (2013.01); *G02B 6/009* (2013.01); *G02B 6/0085* (2013.01); *G02F 2001/133628* (2013.01)

(58) Field of Classification Search
CPC ................... G02F 1/133308; G02F 1/133608; G02F 1/133615; G02F 2001/133317; G02F 1/133603; G02F 2201/46; G02F 2201/465; G02F 2001/133322; G02F 2201/503; G02F 2001/13332; G02F 2001/133628; G02F 2001/133328; G02F 1/1336; G02F 1/0336; G02F 1/033615; H04N 5/645; H01L 23/4093; H01L 23/4006; H01L 23/3677; H01L 23/3672; H01L 23/36; H01L 23/40; H01L 23/34; H01L 23/367; H01L 23/3675; F21Y 2105/001; F21Y 2105/005; F21Y 2111/008; F21Y 2101/02; F21Y 2103/003; F21K 9/00; F21K 9/30; Y10S 345/905; Y10S 362/80; H05K 2201/10106; H05K 3/0064; H05K 3/0067; H05K 7/209; H05K 7/20; H05K 7/20963; F21V 19/001; F21V 19/003; F21V 19/0035; F21V 19/0045; G02B 6/0073; G02B 6/009
USPC ................. 362/555, 800, 600, 612, 631–633, 362/97.1–97.3, 748, 752; 349/58, 65; 361/679.46, 679.54, 688, 709–711, 361/714
See application file for complete search history.

(56) References Cited

U.S. PATENT DOCUMENTS

2009/0310335 A1* 12/2009 Park .................. G02F 1/133603
                                                            362/97.1
2012/0087110 A1*  4/2012 Lee ......................... G02B 6/009
                                                            362/97.3
2012/0293728 A1* 11/2012 Yokohama .................... 348/739

FOREIGN PATENT DOCUMENTS

CN        102067018 A      5/2011

*Primary Examiner* — Paisley L Arendt
*Assistant Examiner* — Angela Davison
(74) *Attorney, Agent, or Firm* — Andrew C. Cheng

(57) ABSTRACT

Disclosed is a fastening device for a LED light string of a backlight module, including a LED light string and a frame, the LED light string being configured with a substrate and a plurality of LEDs mounted onto the substrate, wherein at least a retainer is incorporated on the substrate, and the frame being provided with a notch matchable with the retainer such that the LED light string can be securely attached to the frame. The retainer can be made individually and a then attached to the backside of the LED light string. In addition, with the retainer readily snapped into the notch of the frame, a distance between to the LED light emitting surface to the frame is also reduced, and this helps to realize the design of narrow-boarder of the liquid crystal display.

15 Claims, 4 Drawing Sheets

FASTENING DEVICE FOR LED LIGHT STRING OF BACKLIGHT MODULE AND LIQUID CRYSTAL DISPLAY

FIELD OF THE INVENTION

The present invention relates to a technology of liquid crystal display, and more particularly, to a fastening device for a LED light string of a backlight module, and a liquid crystal display incorporated with such a device.

DESCRIPTION OF PRIOR ART

Backlight module is one of the vital compartments of a liquid crystal display. Since the liquid crystal cannot illuminate itself, it needs a backlight module to project light beam so as to illuminate patterns and images of the liquid crystal panel. A key function of the backlight module is to provide a homogenous, evenly-distributed brightness across the liquid crystal panel so as to have the liquid crystal panel function normally for intended purposes.

Currently, the backlight module used for large screen has its light source arranged either upper and lower longitudinal sides, or one of the upper and lower longitudinal sides. In either case, each side has two LED light strings mounted thereto, and the LED light strings are mounted onto the longitudinal frame of the LED backlight module. Let take the middle frame as an example, in the current practice, a backboard of the backlight module is provided with a plurality of embossments, and by this, a thickness of 0.6 to 1.2 mm will be increased, and this limitation shall be observed so as to meet the narrow-boarder frame requirement. Alternatively, the backboard can be omitted, and the heatsink is exposed. The heatsink is provided with embossments on its sidewall. However, the manufacturing process is specially difficult, and the height of the embossment is limited within 0.5 mm. With this limitation, it can hardly secure the middle frame which needs at least 1.0 mm, and it is impossible to secure the front frame, as it needs at least 1.3 mm.

Hence, it is necessary to design a fastening device for the LED light string of the backlight module and a frame so as to overcome the difficult encountered by the prior art.

SUMMARY OF THE INVENTION

It is an object of the present invention to provide a fastening device for a LED light string of a backlight module so as to simply the overall and modular configuration while realizing the narrow-border design of the liquid crystal display as well as reducing the impact of the seaming of the liquid crystal display.

In order to achieve the object set forth, the present invention provides a fastening device for a LED light string of a backlight module, including a LED light string and a frame, the LED light string being configured with a substrate and a plurality of LEDs mounted onto the substrate, wherein at least a retainer is incorporated on the substrate, and the frame being provided with a notch matchable with the retainer such that the LED light string can be securely attached to the frame.

Preferably, the retainer has a wedged shape.
Preferably, the retainer is made from sheet metal or metallic block.
Preferably, the retainer is made from resin material.
Preferably, the retainer is mounted onto the substrate by means of SMT.

Preferably, when the retainer is made from metallic material, the fastening device includes an extension facing the LED light string and is in parallel to the substrate.

In order to achieve another object set forth, the present invention provides a backlight module, wherein it is configured with a LED light string and a frame, the LED light string including a substrate and a plurality of LEDs mounted onto the substrate, a retainer is incorporated on the substrate, and the frame being provided with a notch matchable with the retainer such that the LED light string can be securely attached to the frame.

Preferably, a heatsink is incorporated, and the LED light string is attached to the heatsink by means of rivet or screw.

In order to achieve still another object set forth, the present invention provides a liquid crystal display, including a liquid crystal panel and a backlight module coupled thereto, wherein the backlight module includes a fastening device configured with a LED light string and a frame, the LED light string including a substrate and a plurality of LEDs mounted onto the substrate, a retainer is incorporated on the substrate, and the frame being provided with a notch matchable with the retainer such that the LED light string can be securely attached to the frame.

As compared with the existing prior art, the fastening device for the LED light string can be concluded with the following advantages. The retainer of the fastening device is made individually such that it goes beyond the manufacturing limits of the prior art. Specially, a SMT process is utilized to attach the retainer of the fastening device on the backside of the LED light string. With this convenient arrangement, a lot of manufacturing processes have been omitted. Even though the retainer of the fastening device is made individually, it can be properly integrally incorporated into the LED light string, as a result, there is no additional component included, while a lot of precious space is saved. The LED light string and the frame can be modulated, and the overall configuration of the module is simplified. In addition, with the retainer readily snapped into the notch of the frame, a distance between to the LED light emitting surface to the frame is also reduced, and this helps to realize the design of narrow-boarder of the liquid crystal display.

DETAILED DESCRIPTION OF PREFERRED EMBODIMENT

In order to give a better and thorough understanding to the whole and other intended purposes, features and advantages of the technical solution of the present invention, detailed description will be given with respect to preferred embodiments provided and illustrated herebelow in accompanied drawings. However, the substantial embodiments disclosed herebelow are merely of illustration instead of the limitations of the embodiments of the present invention.

The improvement of the backlight module resides on the securement of the LED light string and the frame. In the present invention, a fastening device is used to attach the LED light string to a frame of the backlight module. Of course, the LED light string can be attached to other compartment, and detailed description will be given to the backlight module implemented with such fastening device.

Figure 1:
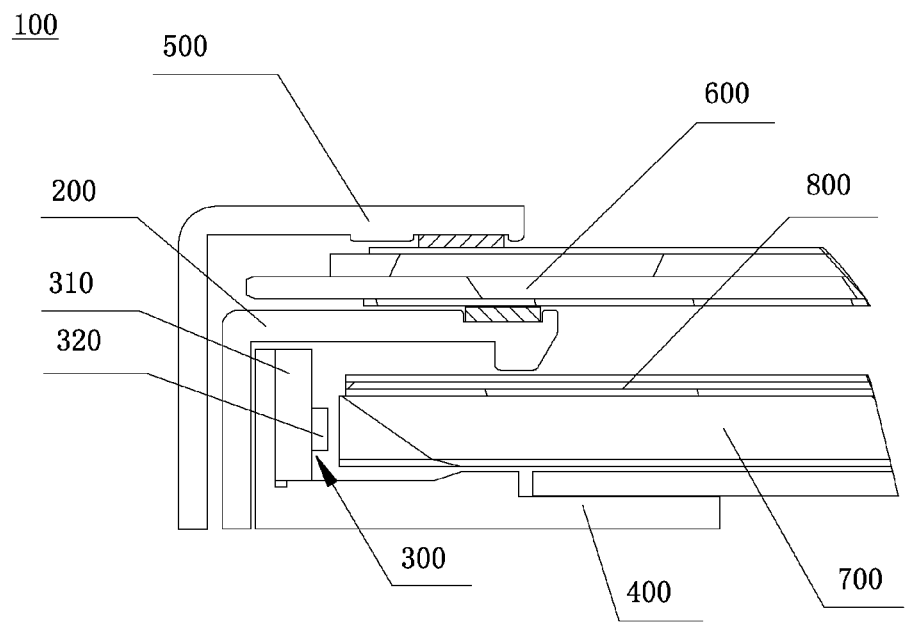
FIG. 1 is a configurational view of a liquid crystal display made in accordance with the present invention.
Figure 2:
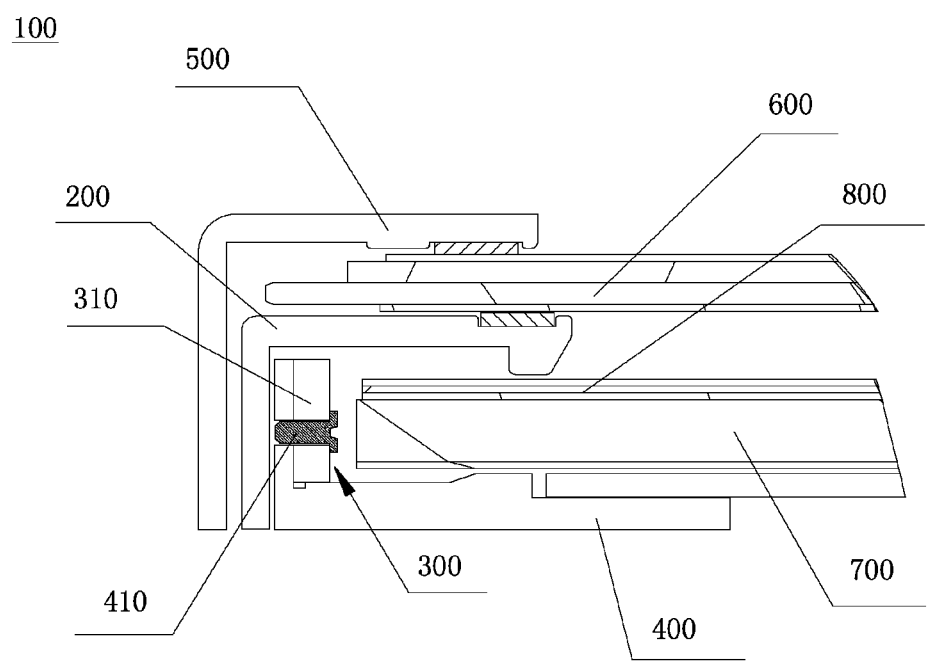
FIG. 2 is a configurational view showing the attaching arrangement between the LED light string and a heatsink in accordance with the present invention.
Figure 3:
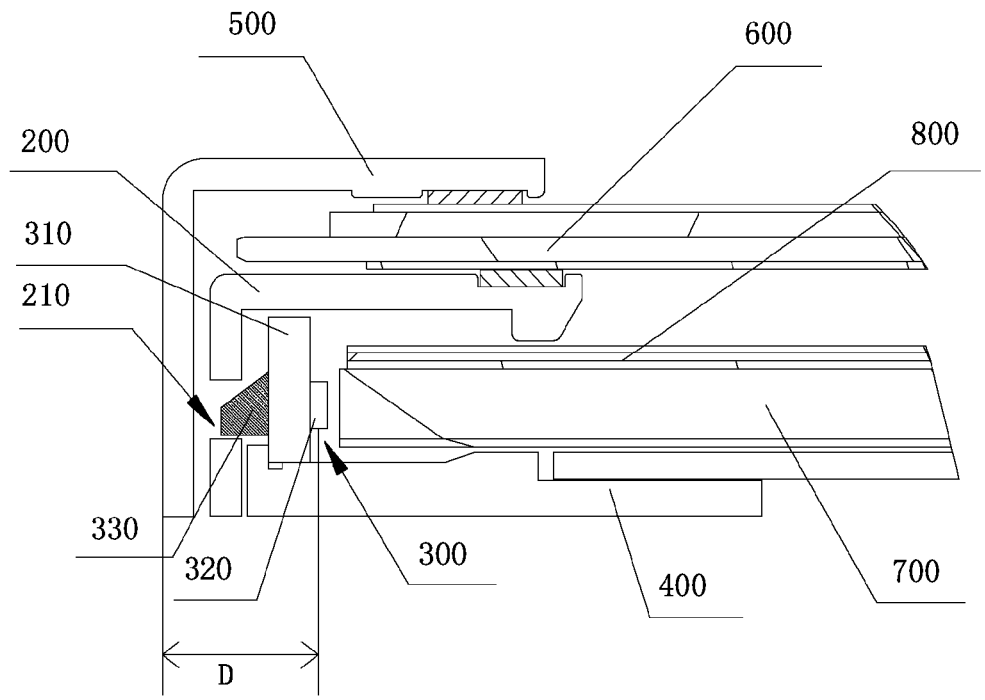
FIG. 3 is a configurational view of the fastening device made in accordance with the present invention.

Referring to FIGS. 1 to 3, the backlight module can be implemented into the liquid crystal display 100. As shown in FIG. 1, the backlight module includes a frame 200, a LED light string 300, and a heatsink 400. The heatsink 400 is in contact with the LED light string 300 for dissipating heat built-up in the LED light string 300. As it can be readily seen from FIG. 1, the LED light string 300 includes a substrate 310, and a plurality of LEDs 320 mounted onto the substrate 310. As shown in FIG. 2, the attachment of the substrate 310 to the heatsink 400 is by way of screw 410, and the LED light string 300 is therefore attached to the heatsink 400 accordingly. By this arrangement, the anchorage of the LED light string 300 can be enhanced. Wherein the frame 200 can be a middle frame or a front frame, and in the current embodiment, the frame 200 is the middle frame. As shown in FIG. 3, the substrate 310 is incorporated with at least a retainer 330, and the frame 200 is defined with at least a notch 210. By the interengagement of the retainer 330 and the notch 210, the LED light string 330 can be readily and conveniently secured to the frame 200.

Substantially, in the preferred embodiment of the fastening device of the LED light string of the backlight module, the retainer 330 can be embodied into a wedge block, and the notch 210 defined in the frame 200 can be a rectangular opening matching with the wedge-shaped retainer 330. In the current embodiment, the retainer 330 is made individually from sheet metal or by metallic block. The substrate 310 can be made from metal board or resin board. The retainer 330 can be secured to the backside of the substrate 310 of the LED light string 300 by ways of SMT process. With the implementation of the SMT process to attach the retainer 300 to the substrate, the overall assembling of the retainer 330 to the LED light string 300 is simplified. Once the overall process is simplified, limitation of the conventional technology is broken through, and the efficiency is also upgraded.

Figure 4:
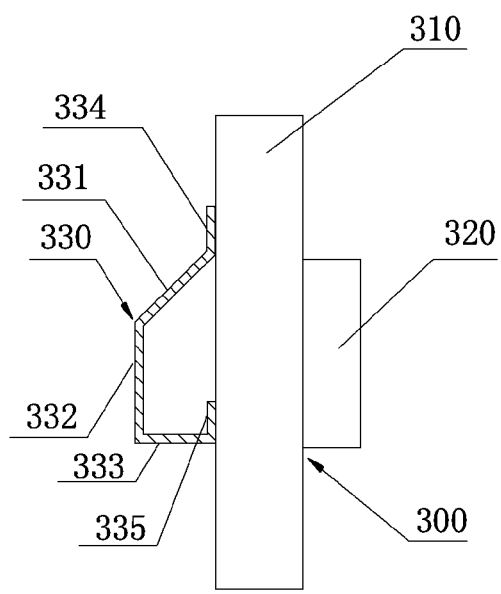
FIG. 4 is a cross sectional view of a retainer of Example 1 made in accordance with the present invention.

Referring FIG. 4, a cross sectional view of a retainer of Example 1 made in accordance with the present invention is shown. The retainer 330 is attached to the backside of the substrate 310. In the current embodiment, the retainer 330 is made from metallic sheet or sheet metal. The retainer 330 is integrally formed, and includes a first sidewall 331, a second sidewall 332, and a third sidewall 333. The second sidewall 332 is in parallel to the surface of the substrate 310, and the first sidewall 331 and the third sidewall 333 are disposed on both side of the second sidewall 332. The first sidewall 331 is an inclined configuration. In order to increase the surface area of soldering between the retainer 330 and the substrate 310, the retainer 330 further includes an extension from the sidewall and which is in parallel with respect to the substrate 310 of the LED light string 300. As shown in FIG. 4, a first extension 334 extends from the first sidewall 331 and along the substrate 310, and the second extension 335 extends from the third sidewall 333 and along the substrate 310. Both the first and second extensions 334, 335 are in contact with the substrate 310.

In assembling, the retainer 330 is firstly soldered onto the LED light string 300, and then attached to the heatsink 400 by way of screw 410. The retainer 330 can be conveniently engaged with the notch 210 of the frame 200 by the guidance of the first surface 331, which is an inclined surface. The frame 200 can be made from resin material so as to provide certain flexibility. It should be noted that with the provision of the inclined surface of the retainer 330, the interengagement between the retainer 330 and the notch 210 can be more conveniently performed.

Preferably, the retainer is attached to the backside of the substrate by ways of SMT process which increases the reliability and quality of the solder joint. During the assembling of the LED light string and the frame, no need of secondary process as the retainer 330 of the LED light string 300 can be simply pushed to snap into the notch 210 of the frame 200. Specially, the retainer 330 can be completely received within the notch 210 of the frame 200 and this can significantly reduce a distance between the LED light to a side of the boarder of the module, i.e. the distance "D" marked in FIG. 3. This arrangement can effectively resolve the design problem encountered by the super-narrow-boarder of the liquid crystal display.

Example 2

Figure 5:
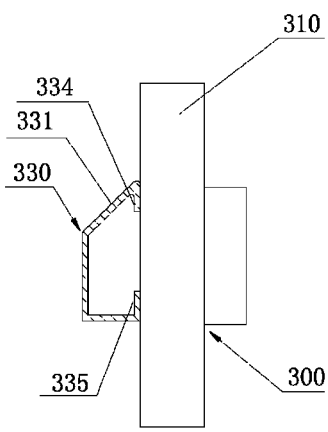
FIG. 5 is a cross sectional view of a retainer of Example 2 made in accordance with the present invention.

Referring to FIG. 5, a cross sectional view of a retainer of Example 2 made in accordance with the present invention. In the Example 2, the configuration of the retainer is similar to the retainer shown in Example 1, as a result, identical numeral reference will be used to represent identical part. The difference resides that the first extension 334 extends inwardly from the first sidewall 331 and located completely under the retainer 330.

Example 3

Figure 6:
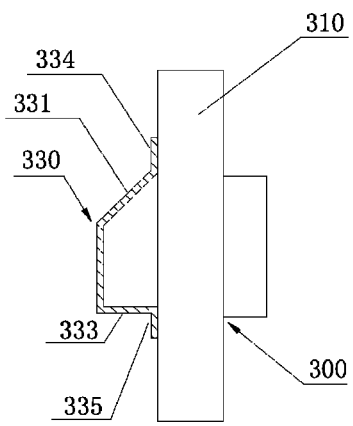
FIG. 6 is a cross sectional view of a retainer of Example 3 made in accordance with the present invention.

Referring to FIG. 6, a cross sectional view of a retainer of Example 3 made in accordance with the present invention. In the Example 3, the configuration of the retainer is similar to the retainer shown in Example 1, as a result, identical numeral reference will be used to represent identical part. The difference resides that the second extension 335 extends outwardly from the third sidewall 333 and located completely outside of the retainer 330. In comparison, this embodiment is even more stable than the Example 1.

Example 4

Figure 7:
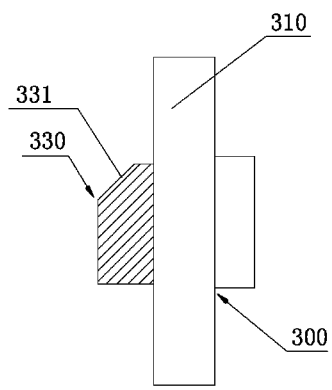
FIG. 7 is a cross sectional view of a retainer of Example 4 made in accordance with the present invention.

Referring to FIG. 7 which a cross sectional view of a retainer of Example 4 made in accordance with the present invention. As compared to Example 1, in the current embodiment, the retainer 330 is made from a metallic block, and a whole under surface 337 is soldered onto the substrate 310. It can be readily seen that the overall soldering surface joint between the retainer 330 and the substrate 310 is increased tremendously. Accordingly, the anchorage of the retainer 330 onto the substrate 310 has been increased tremendously.

Example 5

Figure 8:
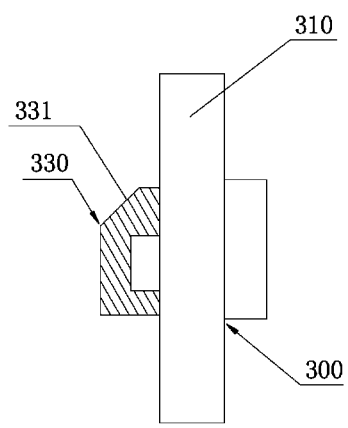
FIG. 8 is a cross sectional view of a retainer of Example 5 made in accordance with the present invention.

Referring to FIG. 8, which is a cross sectional view of a retainer of Example 5 made in accordance with the present invention. In the Example 5, the configuration of the retainer is similar to the retainer shown in Example 4, as a result, identical numeral reference will be used to represent identical part. The difference resides that in the current embodiment, the retainer 330 is made from hollowed metallic block. As compared to Example 4, the effective soldering area joint between the retainer 330 and the substrate 310 may seem to be the same, however, the material used has been reduced.

Based on the fastening device for the LED light string of the backlight module, the present invention further provides a liquid crystal display 100 such as shown in FIG. 3, and which includes a front frame 500, a liquid crystal display panel 600, and a backlight module. The backlight module includes a frame 200, a LED light string 300, a heatsink 400, a waveguide 700, and an optical film 800. The engagement between the LED light string 300 and the frame 200 is facilitated by any one of the Examples of the fastening device described above. Accordingly, the overall configuration is simplified. The distance from the light-emitting surface of the LED light string to an edge of the module has been shortened and the narrow-boarder design is realized.

As compared with the existing prior art, the fastening device for the LED light string can be concluded with the following advantages. The retainer of the fastening device is made individually such that it goes beyond the manufacturing limits of the prior art. Specially, a SMT process is utilized to attach the retainer of the fastening device on the backside of the LED light string. With this convenient arrangement, a lot of manufacturing processes have been omitted. Even though the retainer of the fastening device is made individually, it can be properly integrally incorporated into the LED light string, as a result, there is no additional component included, while a lot of precious space is saved. The LED light string and the frame can be modulated, and the overall configuration of the module is simplified. In addition, with the retainer readily snapped into the notch of the frame, a distance between to the LED light emitting surface to the frame is also reduced, and this helps to realize the design of narrow-boarder of the liquid crystal display.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A fastening device for a LED light string of a backlight module, including a LED light string and a frame, the LED light string being configured with a substrate and a plurality of LEDs mounted onto the substrate, wherein at least a retainer is incorporated on the substrate, and the frame being provided with a notch matchable with the retainer such that the LED light string is securely attached to the frame, wherein the retainer comprises a first side wall, a second side wall, and a third side wall, the second side wall being substantially parallel to a surface of the substrate, and first and third side walls respectively extending from opposite ends of the second side wall to the surface of the substrate in such a way that the first side wall is inclined with respect to the surface of the substrate and the third side wall is substantially perpendicular to the surface of the substrate, the first, second, and third side walls and the surface of the substrate collectively defining a right trapezoid in which the first and third side walls are legs of the trapezoid, and the second side wall is a short base that is shorter than an opposite base of the trapezoid defined by the surface of the substrate, wherein the first side wall forms a slope that extends upwards from the second side wall in an inclined direction toward the substrate so that the first side wall and the third side wall are convergent toward each other in a direction away from the surface of the substrate in order to guide engagement of the retainer into the notch of the frame in a direction parallel to the surface of the substrate.

2. The fastening device for a LED light string as of a backlight module as recited in claim 1, wherein the retainer is made from sheet metal.

3. The fastening device for a LED light string as of a backlight module as recited in claim 2, wherein the retainer is mounted onto the substrate.

4. The fastening device for a LED light string as of a backlight module as recited in claim 2, wherein the retainer is integrally configured, and includes an extension facing the LED light string and is in parallel to the substrate.

5. The fastening device for a LED light string as of a backlight module as recited in claim 1, wherein the retainer is made from metallic block.

6. The fastening device for a LED light string as of a backlight module as recited in claim 5, wherein the retainer is mounted onto the substrate.

7. The fastening device for a LED light string as of a backlight module as recited in claim 1, wherein the substrate is made from metal.

8. The fastening device for a LED light string as of a backlight module as recited in claim 1, wherein the substrate is made from resin material.

9. The fastening device for a LED light string as of a backlight module as recited in claim 1, wherein the frame is a middle frame.

10. The fastening device for a LED light string as of a backlight module as recited in claim 1, wherein the frame is a front frame.

11. A backlight module, wherein it is configured with a LED light string and a frame, the LED light string including a substrate and a plurality of LEDs mounted onto the substrate, a retainer is incorporated on the substrate, and the frame being provided with a notch matchable with the retainer such that the LED light string is securely attached to the frame, wherein the retainer comprises a first side wall, a second side wall, and a third side wall, the second side wall being substantially parallel to a surface of the substrate, and first and third side walls respectively extending from opposite ends of the second side wall to the surface of the substrate in such a way that the first side wall is inclined with respect to the surface of the substrate and the third side wall is substantially perpendicular to the surface of the substrate, the first, second, and third side walls and the surface of the substrate collectively defining a right trapezoid in which the first and third side walls are legs of the trapezoid, and the second side wall is a short base that is shorter than an opposite base of the trapezoid defined by the surface of the substrate, wherein the first side wall forms a slope that extends upwards from the second side wall in an inclined direction toward the substrate so that the first side wall and the third side wall are convergent toward each other in a direction away from the surface of the substrate in order to guide engagement of the retainer into the notch of the frame in a direction parallel to the surface of the substrate.

12. The backlight module as recited in claim 11, wherein a heatsink is incorporated, and the LED light string is attached to the heatsink by means of rivet or screw.

13. A liquid crystal display, including a liquid crystal panel and a backlight module coupled thereto, wherein the backlight module includes a fastening device configured with a LED light string and a frame, the LED light string including a substrate and a plurality of LEDs mounted onto the substrate, a retainer is incorporated on the substrate, and the frame being provided with a notch matchable with the retainer such that the LED light string is securely attached to the frame, wherein the retainer comprises a first side wall, a second side wall, and a third side wall, the second side wall being substantially parallel to a surface of the substrate, and first and third side walls respectively extending from opposite ends of the second side wall to the surface of the substrate in such a way that the first side wall is inclined with respect to the surface of the substrate and the third side wall is substantially perpendicular to the surface of the substrate, the first, second, and third side walls and the surface of the substrate collectively defining a right trapezoid in which the first and third side walls are legs of the trapezoid, and the second side wall is a short base that is shorter than an opposite base of the trapezoid defined by the surface of the substrate, wherein the first side wall forms a slope that extends upwards from the second side wall in an inclined direction toward the substrate so that the first side wall and the third side wall are convergent toward each other in a direction away from the surface of the substrate in order to guide engagement of the retainer into the notch of the frame in a direction parallel to the surface of the substrate.

14. The backlight module as recited in claim 13, wherein the retainer is mounted onto the substrate.

15. The backlight module as recited in claim 13, wherein the retainer is integrally configured, and includes an extension facing the LED light string and is in parallel to the substrate.

* * * * *